(12) United States Patent
Kai et al.

(10) Patent No.: US 7,797,098 B2
(45) Date of Patent: Sep. 14, 2010

(54) ENGINE CONTROL DEVICE

(75) Inventors: Shisei Kai, Fujisawa (JP); Masao Okada, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 225 days.

(21) Appl. No.: 12/091,377

(22) PCT Filed: Oct. 26, 2006

(86) PCT No.: PCT/JP2006/321406

§ 371 (c)(1),
(2), (4) Date: Apr. 24, 2008

(87) PCT Pub. No.: WO2007/049714

PCT Pub. Date: May 3, 2007

(65) Prior Publication Data

US 2009/0287395 A1  Nov. 19, 2009

(30) Foreign Application Priority Data

Oct. 28, 2005  (JP)  ............................... 2005-314469

(51) Int. Cl.
*F02D 29/00* (2006.01)
(52) U.S. Cl. .................................................... 701/104
(58) Field of Classification Search ................... 701/36, 701/50, 104; 123/395, 402, 358, 344
See application file for complete search history.

(56) References Cited

U.S. PATENT DOCUMENTS 5,740,044 A * 4/1998 Ehrenhardt et al. ........... 701/50
5,971,888 A * 10/1999 Goode ........................... 74/11
6,021,754 A * 2/2000 Kendrick ..................... 123/478
6,553,302 B2 * 4/2003 Goodnight et al. ............ 701/54
7,222,015 B2 * 5/2007 Davis et al. .................. 701/104

FOREIGN PATENT DOCUMENTS

| JP | 2000-080934 A | 3/2000 |
| JP | 2006-046249 A | 2/2006 |
| WO | 2004-029438 A1 | 4/2004 |

OTHER PUBLICATIONS

International PCT Search Report for PCT/JP2006/321406 dated Nov. 15, 2006.

* cited by examiner

*Primary Examiner*—Stephen K Cronin
*Assistant Examiner*—Arnold Castro
(74) *Attorney, Agent, or Firm*—McCormick, Paulding & Huber LLP

(57) ABSTRACT

An engine control device, which is capable of preventing fuel from being consumed more than necessary when a PTO device is in operation, is provided. An engine control device (5), in which a PTO device (12) is connected to a vehicle engine (1) and which controls a fuel injection quantity of the vehicle engine (1) when the PTO device (12) is in operation, is provided with PTO switching means for switching between operation and non-operation of the PTO device (12), and PTO fuel limiting means (3) for limiting a fuel injection quantity of the vehicle engine (1) to be less than a predetermined fuel limit value that is set in advance, when the PTO device (12) is switched to an operational state by the PTO switching means.

6 Claims, 4 Drawing Sheets

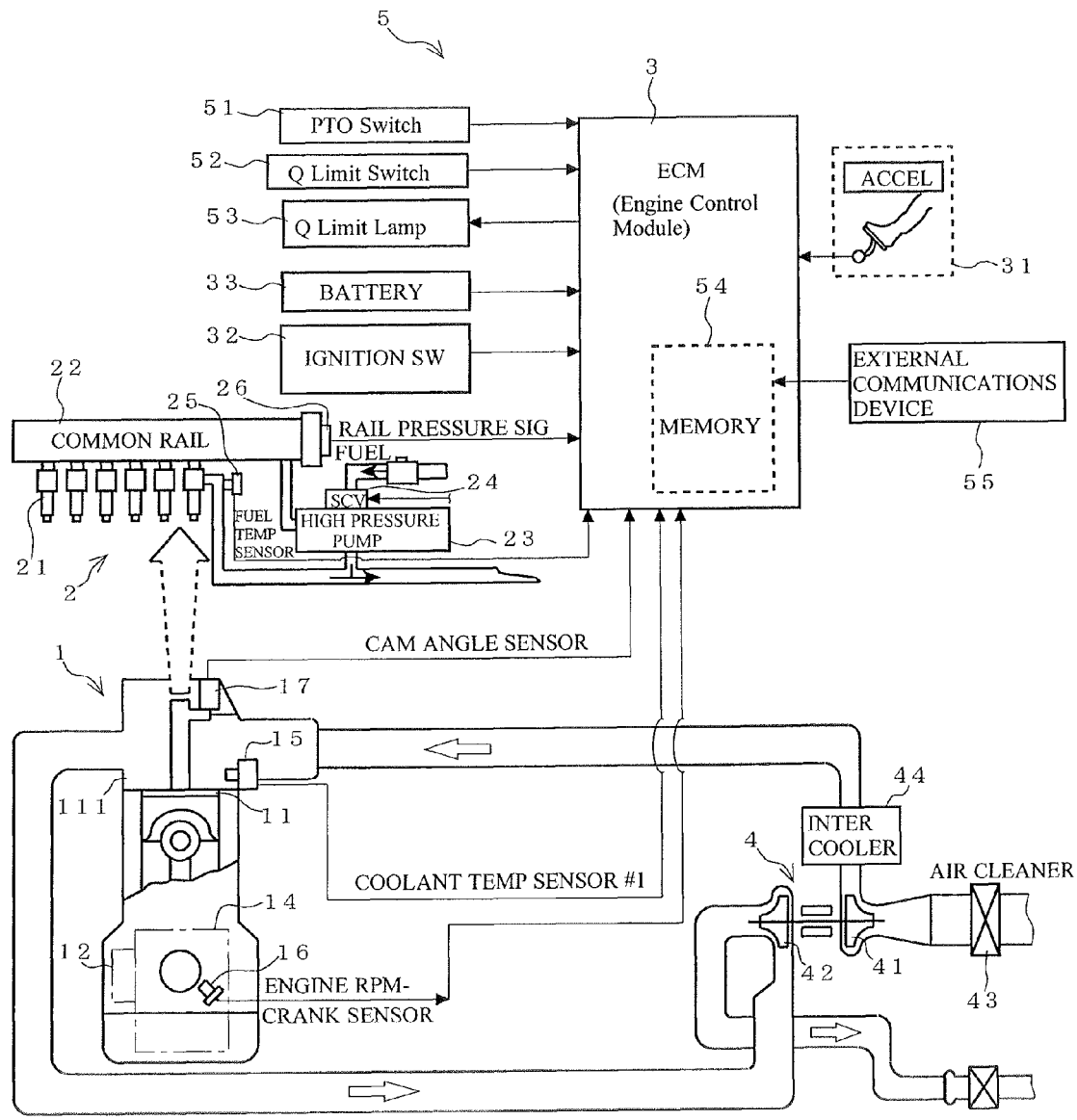
F I G. 1

ENGINE CONTROL DEVICE

CROSS REFERENCE TO RELATED APPLICATIONS

This application is entitled to the benefit of and incorporates by reference essential subject matter disclosed in International Patent Application No. PCT/JP2006/321406 filed on Oct. 26, 2006 and Japanese Patent Application No. 2005-314469 filed Oct. 28, 2005.

TECHNICAL FIELD

The present invention relates to how to control an engine control device of a fuel injection quantity for a vehicle engine with a PTO (power take off) when the PTO is in operation.

BACKGROUND ART

Heretofore, in specially-equipped vehicles such as dump trucks, fire engines, etc., a PTO device is connected to the vehicle engine to supply power to a mounted device such as a pump or the like. For example, the PTO device is switched to a non-operating state when the vehicle running and power is supplied to the vehicle driving system. the PTO device is switched to an operational state when the vehicle is stopped and the mounted device is to be operated (PTO operation), and power is supplied to the mounted device.

Furthermore, the power required from PTO operations and vehicle running differs, and thus the engine control is desired to have variable mode for each case.

For example, in Japanese Laid-Open Patent Publication No. 2000-80934, a fuel control device has been proposed, in which control modes that are based on engine speed and the fuel supply quantity (injection quantity) are prepared individually for vehicle running and PTO operation. The control mode is switched between PTO operating mode and vehicle running mode in response to the ON-OFF PTO device switch. The control device of Japanese Laid Open Patent Publication No. 2000-80934 consists of a fuel injection map of the vehicle running, and a fuel injection map of PTO operation, which serves as the engine control when the PTO device is in operation.

DISCLOSURE OF THE INVENTION

However, according to the prior art control system, in the fuel injection map of PTO operation, the maximum fuel injection quantity, or more specifically, the fuel injection quantity when the accelerator is operated 100%, is fixed with respect to the fuel injection map of the vehicle running, and thus it is possible for fuel to be consumed more than necessary during PTO operation.

For example, in certain cases, such as when a comparatively small scale device is mounted on a large sized vehicle, compared to the power required during running of the vehicle, in the event that power needed during operation of the mounted device is small, when the accelerator is operated fully during PTO operation, fuel is supplied excessively to the vehicle engine, and thus a problem results in that fuel is consumed unnecessarily.

Consequently, an object of the present invention is to provide an engine control device that solves the above problem, and which can control fuel such that no more than necessary is supplied when the PTO device is in operation.

To solve the aforementioned problem, the present invention provides an engine control device, in which a PTO device is connected to a vehicle engine and which controls a fuel injection quantity of the vehicle engine when the PTO device is in operation, the engine control device comprising PTO switching means for switching between operation and non-operation of the PTO device, and PTO fuel limiting means for limiting a fuel injection quantity of the vehicle engine to be less than a predetermined fuel limit value that is set in advance, when the PTO device is switched to an operational state by the PTO switching means.

Preferably, limit selecting means for selecting between operation and non-operation of the PTO fuel limiting means is connected to the PTO fuel limiting means.

Preferably, the PTO fuel limiting means has memory means for storing the fuel limit value, and a limit value setting device for inputting the fuel limit value is connected to the memory means.

Preferably, the PTO fuel limiting means is configured to compensate the fuel limit value based on a coolant water temperature of the vehicle engine.

Preferably, a plurality of fuel limit values corresponding to engine speed is stored in the memory means.

Preferably, when the predetermined fuel limit value that is set in advance is less than a fuel injection quantity necessary to maintain an idle-speed of the vehicle engine, the PTO fuel limiting means does not limit the fuel injection quantity.

Preferably, the PTO fuel limiting means is connected to a fuel injection device of the vehicle engine so as to output a control signal thereto, and calculates the fuel injection quantity supplied to the fuel injection device based on control conditions of the PTO device and a running state of the vehicle engine when the PTO device is in operation.

The compensation based on coolant water temperature may be carried out such that the fuel limit value is raised as the coolant water temperature of the vehicle engine becomes lower when the coolant water temperature is less than a predetermined temperature, and the compensation may not be carried out when the coolant water temperature is equal to or greater than the predetermined temperature.

According to the present invention, a superior effect is brought about, in that fuel can be prevented from being consumed more than necessary when the PTO device is in operation.

BRIEF DESCRIPTION OF THE DRAWINGS

FIG. 1 shows a system diagram for an engine control device according to an embodiment of the present invention;

DETAILED DESCRIPTION OF THE PREFERRED EMBODIMENTS

Figure 2:
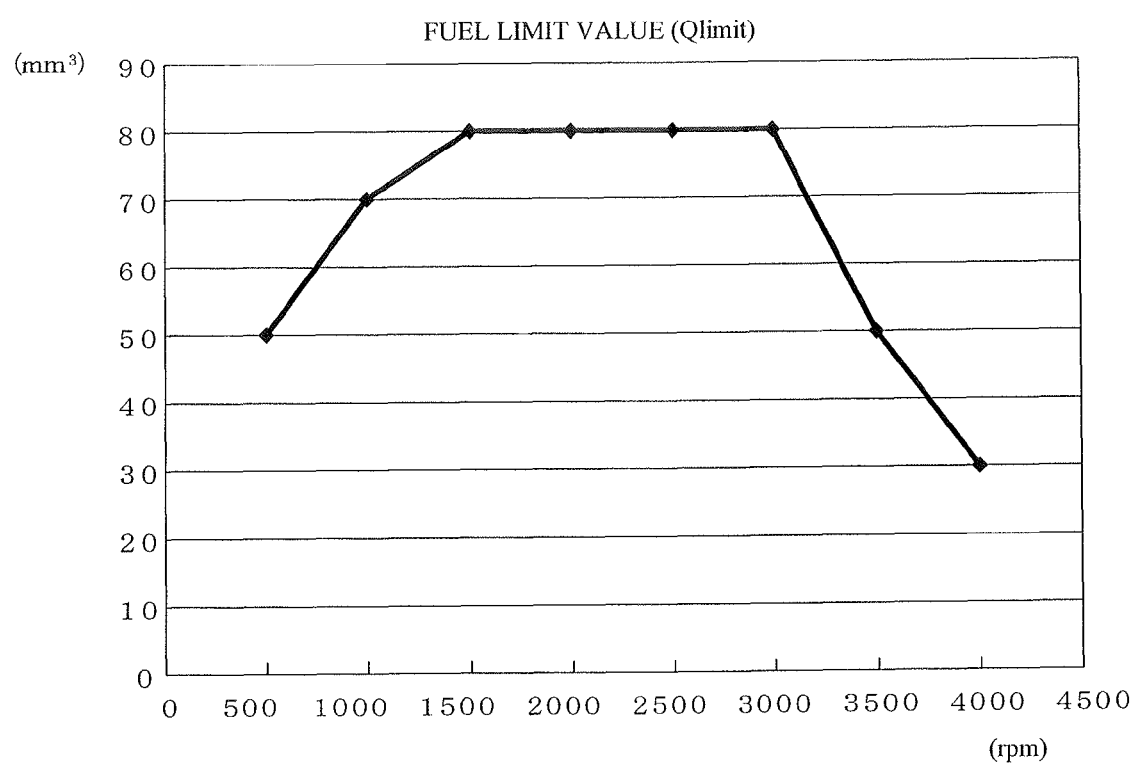
FIG. 2 is an example of a graph illustrating a relationship between engine speed and a fuel limit value.

A preferred embodiment of the present invention shall be described in detail below with reference to the accompanying drawings. The engine control device of the present embodiment controls a vehicle engine of a specially-equipped vehicle such as a dump truck, a fire engine or the like, and is applicable, for example, to a diesel engine.

First, the engine control device of the present embodiment shall be explained with reference to FIG. 1.

As shown in FIG. 1, a vehicle engine (hereinafter referred to as an engine) 1 is provided with a fuel injection device 2 for supplying fuel, and an engine control module (hereinafter referred to as an ECM) 3 that controls the fuel injection device 2.

The fuel injection device 2 comprises injectors 21, which are provided in each engine cylinder, the injectors 21 being connected to a common rail 22. Pressurized fuel is retained in the common rail 22 by a high pressure pump 23. The high pressure pump 23 is connected to a fuel tank (not shown) or the like. The supplied quantity from the fuel tank is adjusted by an SCV valve 24.

A supercharger 4 including a compressor 41 and a turbine 42 is disposed on the engine 1. After intake air, which is introduced through an air cleaner 43, is compressed by the compressor 41, the intake air is cooled by an inter-cooler 44 and supplied to the combustion chamber 11 of the engine 1. After the exhaust gas from the combustion chamber 11 has driven the turbine 42, the exhaust gas is discharged through a non-illustrated after-treatment device or the like.

A PTO device 12 is connected to the engine 1 of the present embodiment for extracting and transmitting power to a mounted device (not shown). An engine control device 5 is disposed on the vehicle for controlling the fuel injection quantity of the aforementioned vehicle engine 1 when the PTO device 12 is in operation.

The PTO device 12 of the present embodiment is disposed on the transmission 14. For example, the PTO device 12 includes a PTO clutch (not shown) interposed between an output side of the transmission 14 and an input side of the mounted device, such that when the PTO clutch is connected, an operational state results in which engine power is transmitted to the mounted device. On the other hand, in the case when the PTO clutch is disengaged, the PTO device 12 is placed in a non-operational state and the engine power is supplied to the vehicle drive system. Naturally, the PTO device 12 is not limited to such a configuration, and various other configurations could also be conceived of.

The engine control device 5 comprises a PTO switch 51, which serves as PTO switching means for switching between operational and non-operational states of the aforementioned PTO device 12, and PTO fuel limiting means for limiting the fuel injection quantity of the engine 1 to be less than a predetermined fuel limit value that is set beforehand, in the case that the aforementioned PTO device 12 is switched to an operational state by the PTO switch 51. The PTO fuel limiting means will be described later in detail, and the ECM 3 serves as the PTO fuel limiting means in the present embodiment.

The PTO switch 51 is switchable between either one of ON or OFF states. When the PTO switch 51 is ON, the PTO clutch is connected and the PTO device 12 is placed in an operational state. When the PTO switch 51 is OFF, the PTO clutch is disengaged and the PTO device 12 is placed in a non-operational state. The PTO switch 51 is connected to the ECM 3, such that the state of the PTO device (operational or non-operational) 12 is are detected by the ECM 3.

Various types of sensors, such as a coolant temperature sensor 15, an engine RPM crank sensor 16, a cam angle sensor 17, a fuel temperature sensor 25 and a common rail pressure sensor 26 or an accelerator pedal sensor 31 and the like, are connected to the ECM 3, and detection signals from the sensors 15 to 17, 25, 26 and 31 are inputted to the ECM 3. The coolant temperature sensor 15 of the present embodiment is mounted on the cylinder head 111, and detects the temperature of coolant water that flows through a coolant water channel of the cylinder head 111.

Further, the ECM 3 is connected to an ignition switch 32 for acquiring an ignition/stop signal for the engine 1. The ECM 3 is connected to a battery 33 for supplying electrical power.

The ECM 3 is connected to the aforementioned fuel injection device 2 to output a control signal thereto, and to control the fuel injection quantity of the engine 1 when the vehicle is running (non-operational time of the PTO device 12), and when the mounted device is operated (operational time of the PTO device 12).

During a non-operational time of the PTO device 12 (when the vehicle is running), basically, the ECM 3 reads in running conditions of the engine 1 from the engine speed, which is detected by the engine RPM crank sensor 16, and the operating ratio of the accelerator, which is detected by the accelerator pedal sensor 31, and the like. Based on such running conditions, the fuel injection quantity to be supplied to the fuel injection device 2 is calculated, and the engine 1 is controlled.

On the other hand, when the PTO device 12 is in operation, the ECM 3 calculates a target fuel injection quantity to be supplied to the fuel injection device 2 based on control conditions of the PTO device 12 and the running conditions of the engine 1. It is judged whether or not the target fuel injection quantity of the engine 1 is less than the predetermined fuel limit value that was set beforehand, and the actual fuel injection quantity is determined. Concerning the running conditions of the engine 1 during the time that the PTO device 12 is in operation, the ECM 3 reads in the engine speed, and the degree at which the accelerator is operated from the accelerator pedal sensor 31, or the degree at which the accelerator of an operating lever (not shown) of the mounted device is opened, etc.

In the present embodiment, a fuel limit switch 52, which serves as limit selecting means for selecting between operation and non-operation of the PTO fuel limiting means, is connected to the ECM 3. The fuel limit switch 52 is configured so that either one of an ON or OFF state is selected thereby. Basically, the ECM 3 executes limiting of the aforementioned fuel injection quantity in the case where both the PTO switch 51 and the fuel limit switch 52 are ON. Further, the ECM 3 causes the fuel limit lamp 53 to be illuminated in the case that the fuel limit switch 52 is ON and extinguishes the fuel limit lamp 53 in the case that the fuel limit switch 52 is OFF, to thereby inform the driver or the operator of the mounted device concerning the status of the fuel limit switch 52.

Further, the ECM 3 includes memory means for storing the predetermined fuel limit value that is set in advance, and is connected to a limit value setting device for inputting the aforementioned fuel limit value to the memory means. Basically, a memory 54 that makes up the memory means is disposed inside the ECM 3, and the memory 54 is connected, through an external communications terminal of the ECM 3, to an external communications device (e.g., a PC or the like) that serves as the limit setting means. In the present embodiment, a plurality of fuel limit values, which correspond to the engine speed, is input by the aforementioned external communications device 55 and stored in the memory 54. The memory 54 is a widely known type of memory device; for example, various types may be considered, such as a flash memory or the like.

Next, control of the fuel injection quantity during operation of the PTO device 12 by means of the engine control device 5 of the present embodiment shall be explained.

According to the present embodiment, first, a fuel limit value(s) (upper limit value) of the fuel injection quantity for use during operation of the PTO device 12 is stored beforehand in the memory 54 of the ECM 3. The fuel limit value is suitably set, for example, corresponding to the required power output or the like of the mounted device. Next, when the PTO device 12 is operated, the actual fuel injection quantity is limited so as to remain less than the fuel limit value that is stored in the memory 54. Consequently, fuel is not injected in excess of the fuel limit value and fuel is prevented from being consumed more than necessary.

The ECM 3 according to the present embodiment basically performs limiting of the fuel injection quantity when the PTO switch 51 is ON and the fuel limit switch 52 is ON. However, in the case that the predetermined fuel limit value that is set beforehand (i.e., the fuel limit value stored in the memory 54) is smaller than a fuel injection quantity (hereinafter, referred to as the minimum idle injection quantity) required to maintain the idle rotation speed (no-load running) of the aforementioned vehicle engine 1, then limiting of the fuel injection quantity is not performed.

Further, the ECM 3 compensates the fuel limit value stored in the memory 54 based on the coolant water temperature of the aforementioned vehicle engine 1, as detected by the coolant temperature sensor 15.

Figure 3:
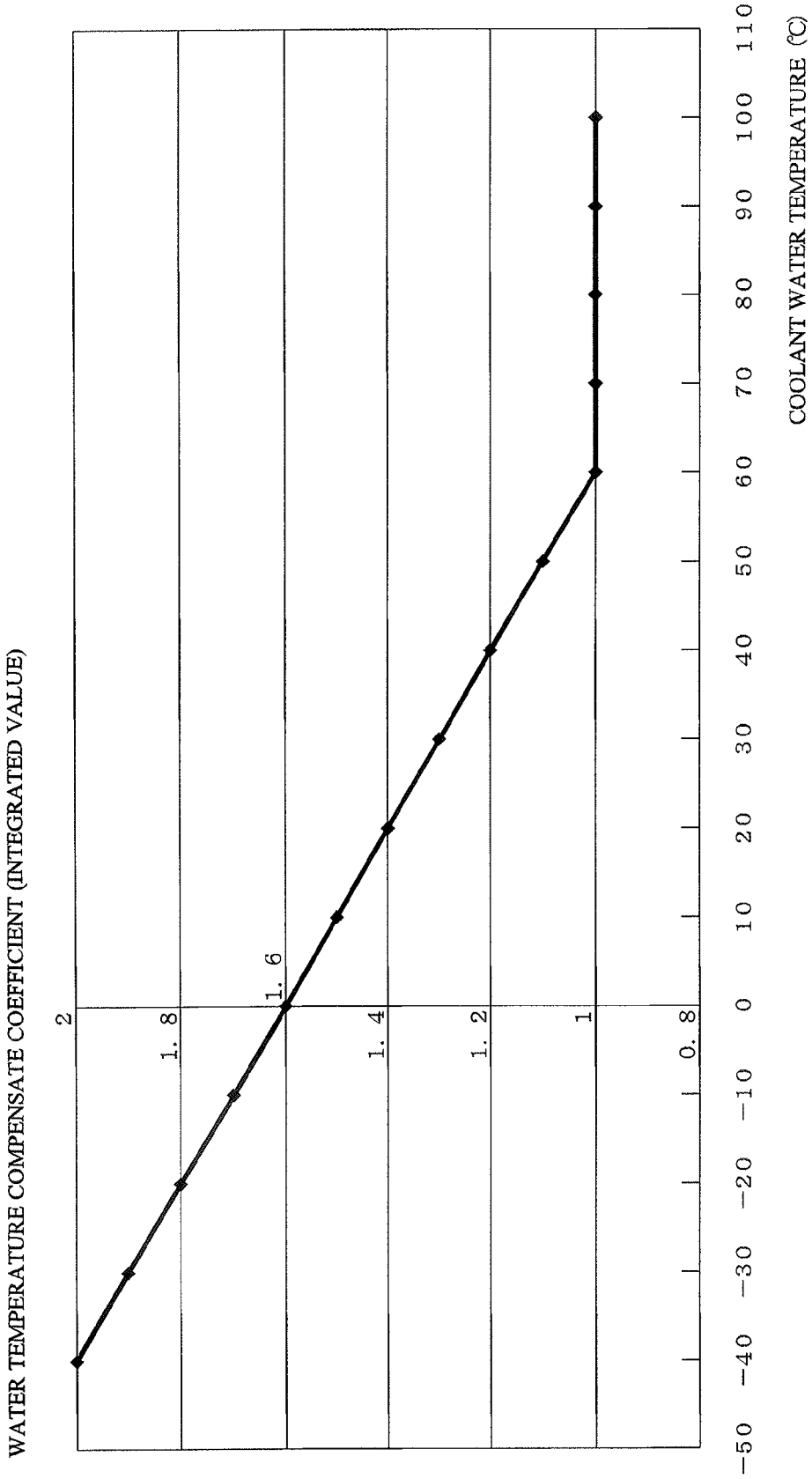
FIG. 3 is an example of a graph illustrating a relationship between a water temperature compensate coefficient for the fuel limit value and the coolant water temperature.

This feature shall be explained with reference to FIG. 3. The graph of FIG. 3 illustrates a relationship between the water temperature compensate coefficient and the coolant water temperature. The coolant water temperature is shown on the horizontal axis, whereas the water temperature compensate coefficient is shown on the vertical axis.

As shown in FIG. 3, in the present embodiment, if the coolant water temperature is less than a predetermined temperature (in the illustrated example, 60° C.), the water temperature coefficient set on the vertical axis is multiplied by the fuel limit value for applying a compensation to the fuel limit value. Within the region at which the coolant water temperature is less than 60° C., the water temperature compensate coefficient is set to become higher to the extent that the coolant water temperature is at a low temperature. Further, if the coolant water temperature is equal to or greater than 60° C., the water temperature compensate coefficient is multiplied, at a value of 1, by the fuel limit value, so that substantially, a compensation is not carried out. Based on the foregoing, when the coolant water temperature is low, for example, when the outside temperature is low or before the engine 1 is warmed up and rotation of the engine 1 is unstable, the fuel injection quantity can be limited appropriately, and limiting of the fuel injection quantity by the fuel limit value can be applied optimally.

Further, the ECM 3 carries out limiting of the fuel injection quantity based on a plurality of fuel limit values corresponding to the engine speed. In the present embodiment, as shown in the graph of FIG. 2, a relationship between engine speed and the fuel limit value is stored as a map (or table) in the memory 54 of the ECM 3. When the PTO device 12 is in operation, the ECM 3 detects the engine speed through the engine RPM crank sensor 16, and based on engine speed, the fuel limit value is read from the aforementioned map.

The map, which is stored in the memory 54 of the ECM 3, can be modified appropriately through the aforementioned external communications device 55 or the like. That is, as shown in FIG. 2, although the fuel limit value changes in accordance with the engine speed, the fuel limit value that corresponds to the engine speed is capable of being set arbitrarily. For example, an operating switch for arbitrarily manipulating the fuel limit value is disposed on the ECM 3 or the like, such that the fuel limit value can be raised or lowered by the operating switch. For example, as shown in FIG. 2, the fuel limit value is uniformly 80 mm$^3$ from 1500 to 3000 rpm. However, by manipulating the fuel limit value through the aforementioned operation switch, the fuel limit value could be set at 70 mm$^3$.

Figure 4:
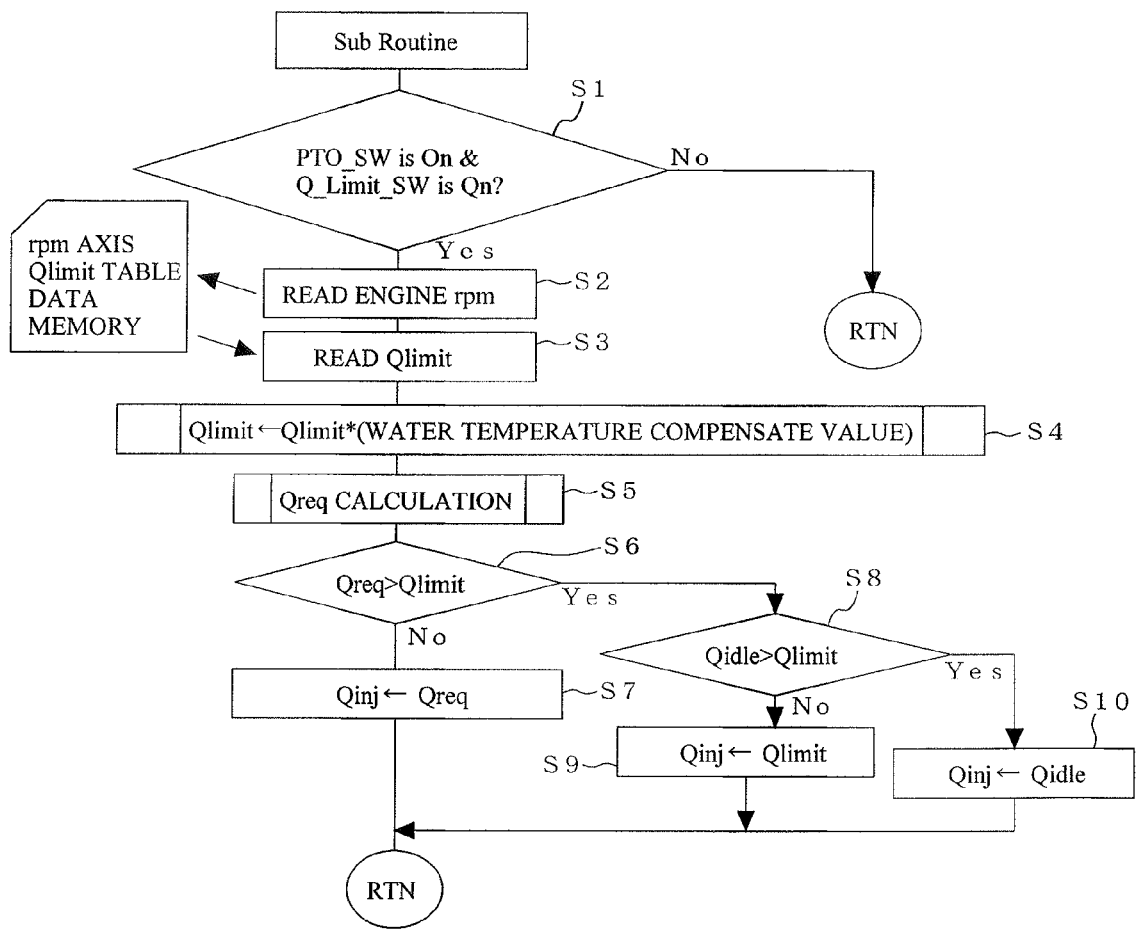
FIG. 4 is a flowchart of a fuel injection quantity control during operation of the PTO device, by means of the engine control device of the present embodiment.

Next, with reference to FIG. 4, an example of the fuel injection control process flow, during operation of the PTO device 12, by means of the engine control device 5 of the present embodiment, shall be explained.

In step S1, it is determined whether the PTO switch 51 and the fuel injection limit switch have been turned ON or not. In the case it is judged that both the PTO switch 51 and the fuel limit switch 52 are ON in step S1, the flow proceeds to step S2 and the engine speed is read in. On the other hand, in the case it is judged that at least one of the PTO switch 51 or the fuel limit switch 52 is OFF in step S1, limiting of the fuel injection quantity is not carried out and injection is performed at the calculated fuel injection quantity.

In step S3, the fuel limit value (Qlimit) from the aforementioned map of FIG. 2 is read in, based on the engine speed read at step S2. That is, a fuel limit value (maximum fuel injection quantity) is read in from the fuel limit table data of the rpm axis, which is stored in the memory 54 of the ECM 3.

In step S4, the fuel limit value read at step S3 is compensated based on the coolant temperature. Essentially, based on the coolant water temperature detected by the coolant temperature sensor 15, a water temperature compensate value is read in from the compensate map (see FIG. 3), which is stored in the memory 54 of the ECM 3. Thereafter, the water temperature compensate value is multiplied by the fuel limit value determined in step S3, thereby compensating the fuel limit value.

In step S5, the target fuel injection quantity is calculated based on the operated quantity of the accelerator (accelerator opening) as detected by the accelerator pedal sensor 31. Apart from the operated ratio of the accelerator, the target fuel injection quantity also may be calculated based on an operated quantity (for example, accelerator opening of the operating lever of the mounted device) of the operating means used for PTO operation.

In step S6, it is judged whether or not the target fuel injection quantity calculated in step S5 exceeds the fuel limit value compensated in step S3.

In step S6, in the case it is judged that the target fuel injection quantity exceeds the fuel limit value, it is then judged further, in step S8, whether or not the fuel limit value is less than a minimum idle-speed injection quantity (for example, a target injection quantity during idling). In the case it is judged that the fuel limit value is less than the minimum idle-speed injection quantity, then in step S10, the minimum idle-speed injection quantity is set at the fuel injection quantity actually injected (hereinafter referred to as the actual fuel injection quantity (Qinj)). On the other hand, in the case it is judged that the fuel limit value is not less than the minimum idle-speed injection quantity, then in step S9, the fuel limit value is set at the actual fuel injection quantity.

On the other hand, in the case it is judged, in step S6, that the target fuel injection quantity does not exceed the fuel limit value, in step S7, the target fuel injection quantity is set at the actual fuel injection quantity.

In the foregoing manner, after setting the actual fuel injection quantity in step S7, step S9 or step S10, fuel is injected by the fuel injection device 2 at the set actual fuel injection quantity.

In this way, in the present embodiment, during operation of the PTO device 12, by limiting the fuel injection quantity to be less than the fuel limit value, consumption of fuel at a greater quantity than necessary can be prevented. Further, by setting the fuel limit value by means of the external communications device 55, it becomes possible for the fuel injection quantity during operation of the PTO device 12 to be limited, so as to be equal to or less than an arbitrarily set value corresponding to customer demands, so that fuel is not consumed any more than necessary when the PTO device 12 is in operation.

In addition, by compensating the fuel limit quantity based on the coolant water temperature, in the case that the magnitude of friction of the engine 1 or the PTO device 12 differs, for example in a low temperature condition or after warm-up, the fuel limit value can be adjusted optimally corresponding to such friction.

Further, because the fuel limit value can be set arbitrarily, the fuel limit value can be set optimally depending on operating of the PTO device 12, for example.

Further, in the case that the fuel limit value is smaller than the fuel injection quantity necessary to maintain the idle-speed of the engine 1, limiting of the fuel injection quantity is not carried out. Therefore, a minimum engine speed is assured, and even when the fuel limit value is set smaller than necessary by mistake, inconveniences such as engine stalling or the like are prevented.

The present invention is not limited to the aforementioned embodiments, and various other modifications and applications thereof may be conceived of.

For example, a structure may be provided that utilizes an external memory, enabling the memory means to be detached from the ECM. Further, an external switch may be provided for arbitrarily manipulating the fuel limit value in the external memory, such that the fuel limit value may be raised and lowered by the external switch. That is, the memory device and the limit value setting device may be formed together integrally, so as to be attachable and detachable from the ECM 3.

While the present invention has been illustrated and described with respect to a particular embodiment thereof, it should be appreciated by those of ordinary skill in the art that various modifications to this invention may be made without departing from the spirit and scope of the present invention.

What is claimed is:

1. An engine control device, in which a PTO device is connected to a vehicle engine and which controls a fuel injection quantity of said vehicle engine when the PTO device is in operation, comprising:

PTO switching means for switching between operation and non-operation of said PTO device; and PTO fuel limiting means for limiting a fuel injection quantity of said vehicle engine to be less than a predetermined fuel limit value that is set in advance, when said PTO device is switched to an operational state by the PTO switching means, wherein said PTO fuel limiting means is configured to compensate said fuel limit value based on a coolant water temperature of said vehicle engine, and wherein the compensation based on said coolant water temperature is carried out such that the fuel limit value is raised as the coolant water temperature of said vehicle engine becomes lower when the coolant water temperature is less than a predetermined temperature, and the compensation is not carried out when the coolant water temperature is equal to or greater than the predetermined temperature.

2. The engine control device according to claim 1, wherein limit selecting means for selecting between operation and non-operation of said PTO fuel limiting means is connected to said PTO fuel limiting means.

3. The engine control device according to claim 1, wherein said PTO fuel limiting means has memory means for storing said fuel limit value, and a limit value setting device for inputting said fuel limit value is connected to the memory means.

4. The engine control device according to claim 3, wherein a plurality of fuel limit values corresponding to engine speed is stored in said memory means.

5. The engine control device according to claim 1, wherein when said predetermined fuel limit value that is set in advance is less than a fuel injection quantity necessary to maintain an idle-speed of said vehicle engine, said PTO fuel limiting means does not limit the fuel injection quantity.

6. The engine control device according to claim 1, wherein said PTO fuel limiting means is connected to a fuel injection device of said vehicle engine to output a control signal thereto, and calculates the fuel injection quantity supplied to said fuel injection device based on control conditions of said PTO device and a running state of said vehicle engine when said PTO device is in operation.

* * * * *